UNITED STATES PATENT OFFICE.

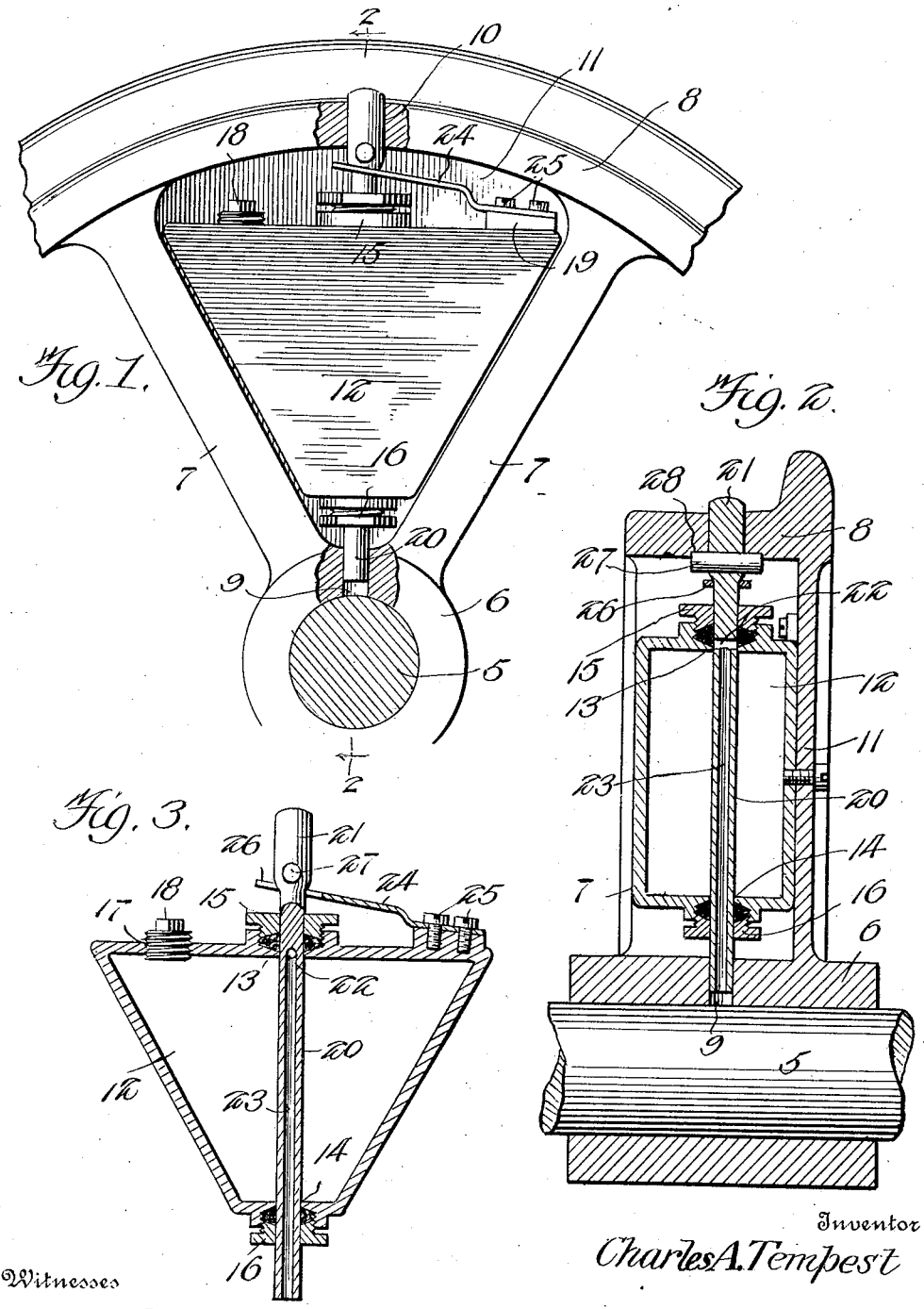

CHARLES A. TEMPEST, OF HAZZARD, PENNSYLVANIA.

CAR-WHEEL LUBRICATOR.

1,050,576. Specification of Letters Patent. Patented Jan. 14, 1913.

Application filed February 7, 1912. Serial No. 675,975.

*To all whom it may concern:*

Be it known that I, CHARLES A. TEMPEST, a citizen of the United States, residing at Hazzard, in the county of Washington and State of Pennsylvania, have invented new and useful Improvements in Car - Wheel Lubricators, of which the following is a specification.

The general object of this invention is to provide an automatic, intermittently operated lubricating device preferably used on mining car wheels, but which if desired, may be applied to any form of car wheels, and which is adapted to be readily attached to a wheel between adjacent spokes thereof, and detached in order that the same may be applied to a new wheel when the old one is worn out.

In carrying out the object of the invention generally stated above it will be understood of course, that the essential features thereof are susceptible to changes in details and structural arrangement, one preferred and practical embodiment being shown in the accompanying drawings wherein;—

Figure 1 is a fragmentary side elevation of a wheel showing the lubricator applied thereof and constructed in accordance with the invention. Fig. 2 is a sectional view on the line 2—2 of Fig. 1. Fig. 3 is a vertical longitudinal sectional view of the lubricator detached.

Referring more particularly to the accompanying drawings it will be seen that the lubricator which will be hereinafter more fully described, is applied to a wheel having the ordinary form of axle 5 upon which is mounted the hub 6 having the radial spokes 7 and the well known rim 8. Between two adjacent spokes of the wheel and in direct alinement with each other, the rim and hub are provided with openings 9 and 10 respectively. A plate 11 of substantially triangular shape and conforming to the space between the two before mentioned spokes is mounted between said spokes and in substantial alinement with one of the peripheral edges of said rim.

A reservoir 12 of substantially similar shape to the plate 11 is secured to said plate in such a manner as to render the same easily detachable. Medially of the outer and inner surfaces of the reservoir, the same is provided with alined openings 13 and 14 surrounding which are the stuffing boxes 15 and 16 respectively. The reservoir 12 is also provided in its outer surface with an opening 17 which is used for filling said reservoir with a lubricant and which is normally closed by means of a plug as indicated by 18. At a diametrically opposite point, said outer surface is provided with an enlargement or block 19, the purpose of which will be hereinafter more fully described.

The means for feeding lubricant from the reservoir 12 to the axle 5 comprises an elongated feed tube 20 which is slidably mounted in the alined openings 9 and 10 of the rim and hub and 13 and 14 of the reservoir. The feed tube 20 is provided at its outer end with an enlarged portion 21 which projects a slight distance beyond the outer periphery of the rim of the wheel so that upon rotation of the same the said tube is forced inwardly upon contact with a rail. This action will cause the lubricant in the reservoir 12 to feed through an opening 22 in the periphery of said tube, said opening communicating with an elongated channel 23 which is co-extensive with said tube and which terminates at the inner end thereof. It will be understood of course that when the tube is in its normal position, that is out of contact with a rail, the opening 22 will be within the stuffing box 15 thereby preventing any undue flow of the lubricant to said opening, or when the tube is pressed inwardly by reason of the contact with a rail the lubricant will be free to flow in said opening and into the channel 23 and thence to the axle 5.

A leaf spring 24 is suitably secured to the block 19 by means of screws as indicated at 25, the free end of said spring being provided with a bifurcation 26 which is adapted to engage the inner end of the enlarged portion 21 of the tube, said spring being adapted to normally retain the outer extremity of said tube beyond the outer periphery of the rim. In order to prevent the tube 20 from disengaging itself from the openings in the reservoir, rim and hub, the enlarged portion 21 thereof is provided with a transverse opening 26 in which is engaged a pin 27 which abuts against a transverse groove 28 formed in the inner periphery of the rim 8 thereby limiting the outward movement of the said tube.

It will thus be seen from the foregoing description that a lubricator has been provided which is simple in construction, durable and positive in operation.

Having thus described the invention what is claimed as new is:—

1. A lubricator comprising a reservoir, a stuffing box carried by said reservoir, and lubricant feeding means mounted in said reservoir and adapted to be normally closed by said stuffing box.

2. In a device of the class described, the combination with a wheel having alined openings in the rim and hub thereof, of a reservoir mounted between two adjacent spokes of said wheel, said reservoir being provided with alined openings which are in alinement with the openings in said wheel, a feed tube slidably mounted in said openings, said tube having its outer extremity projecting normally beyond the periphery of said wheel, means for retaining said tube in its normal position, and means engaging said tube and said rim for limiting the outward movement of said tube.

3. In a device of the character described, the combination of a wheel having alined openings in its hub and rim, of a plate carried by said wheel between two adjacent spokes thereof, said plate being in substantial alinement with one of the peripheral edges of said rim, a reservoir detachably secured to said plate and means slidably mounted in said reservoir and engaging said wheel for intermittently feeding a lubricant to the axle of said wheel.

4. In a device of the character described, the combination with a wheel having alined openings in its rim and hub, of a reservoir having openings in its outer and inner surfaces, said openings being in alinement with the openings in said wheel, stuffing boxes surrounding the openings in said reservoir, a feed tube slidably mounted in the openings in said wheel and reservoir, said feed tube being provided with a channel and an opening in its periphery communicating with said channel, said opening being adapted to be normally closed by the stuffing box in the outer surface of said reservoir and means carried by said reservoir for retaining said tube in its normal position.

5. In a device of the class described, the combination with a wheel having alined openings in its rim and hub, of a reservoir having openings in alinement with the openings in said wheel, a feed tube slidably mounted in said openings, said feed tube having an enlarged portion at its outer extremity, said enlarged portion projecting normally beyond the periphery of said rim, a spring secured to said reservoir and engaging said enlarged portion for retaining said tube in its normal position, said enlarged portion being provided with a transverse opening, and a pin engaging said opening for limiting the outward movement of said tube.

6. A lubricator comprising a reservoir, a feed tube having a channel slidably mounted in said reservoir and adapted to intermittently feed a lubricant to the axle of a wheel, and a bifurcated leaf spring carried exteriorly of said reservoir and engaging said tube for normally retaining the same in an inoperative position.

7. A lubricator comprising a reservoir, a stuffing box carried by said reservoir, and reciprocating lubricant feeding means mounted in said reservoir and adapted to be normally closed by said stuffing box.

8. A lubricator comprising a reservoir, a stuffing box carried by said reservoir, and a feed tube slidably mounted in said reservoir, said tube being provided with a channel and an opening in its periphery communicating with said channel, said opening being adapted to be normally closed by said stuffing box.

9. A lubricator comprising a reservoir, a stuffing box carried by said reservoir, a feed tube slidably mounted in said reservoir, said tube being provided with a channel and an opening in its periphery communicating with said channel, said opening being adapted to be normally closed by said stuffing box, and means carried by said reservoir for retaining said tube in its normal position.

10. A lubricator comprising a reservoir, a stuffing box carried by said reservoir, and spring pressed reciprocating lubricant feeding means mounted in said reservoir and adapted to be normally closed by said stuffing box.

11. A lubricator comprising a reservoir, a stuffing box carried by said reservoir, and means for intermittently feeding a lubricant from said reservoir, said means being adapted to be normally closed by said stuffing box.

In testimony whereof I affix my signature in presence of two witnesses.

CHARLIE TEMPEST.

Witnesses:
SAMUEL C. WEBB,
D. C. HERRON.